United States Patent
Benz et al.

(10) Patent No.: US 6,932,949 B2
(45) Date of Patent: Aug. 23, 2005

(54) REACTOR STRUCTURE AS A HEAT EXCHANGER LAYER STACKING CONSTRUCTION AND METHOD OF MAKING SAME

(75) Inventors: Uwe Benz, Uhldingen-Muehlhofen (DE); Horst Michels, Kirchheim (DE); Alois Tischler, Dorfen (DE); Marc Weisser, Owen/Teck (DE)

(73) Assignee: Ballard Power Systems AG, Kirchheim/Teck-Nabern (DE)

( * ) Notice: Subject to any disclaimer, the term of this patent is extended or adjusted under 35 U.S.C. 154(b) by 552 days.

(21) Appl. No.: 09/971,360

(22) Filed: Oct. 5, 2001

(65) Prior Publication Data

US 2002/0046828 A1 Apr. 25, 2002

(30) Foreign Application Priority Data

Oct. 5, 2000 (DE) ......................................... 100 49 194

(51) Int. Cl.⁷ .............................. B01J 8/00; B23P 15/00
(52) U.S. Cl. ....................... 422/198; 422/206; 422/222; 29/890
(58) Field of Search ........................... 48/61, 62 R, 89, 48/118.5, 127.9; 422/190, 191, 193, 198, 202, 205, 206, 211, 222; 29/890, 890.654

(56) References Cited

U.S. PATENT DOCUMENTS

| | | | | |
|---|---|---|---|---|
| 3,528,783 A | * | 9/1970 | Haselden | 422/188 |
| 4,724,902 A | * | 2/1988 | Gross | 165/166 |
| 5,512,250 A | * | 4/1996 | Betta et al. | 422/173 |
| 5,672,629 A | * | 9/1997 | Heil et al. | 518/704 |
| 5,733,347 A | * | 3/1998 | Lesieur | 48/61 |
| 5,776,421 A | * | 7/1998 | Matsumura et al. | 422/197 |
| 6,277,339 B1 | * | 8/2001 | Boneberg et al. | 422/198 |
| 6,470,569 B1 | * | 10/2002 | Lippert et al. | 29/890 |
| 6,667,011 B1 | * | 12/2003 | Munje et al. | 422/173 |
| 2001/0024629 A1 | * | 9/2001 | Brauchle et al. | |

FOREIGN PATENT DOCUMENTS

| | | | | |
|---|---|---|---|---|
| DE | 44 20 752 | 9/1995 | | C01B/3/32 |
| EP | 0 976 446 | 2/2000 | | B01J/8/02 |
| EP | 1 116 518 | 7/2001 | | F28D/9/00 |
| JP | 8-236129 | * 9/1996 | | H01M/8/02 |
| WO | WO 99/64146 | * 12/1999 | | B01J/19/00 |

OTHER PUBLICATIONS

Copy of EPO Search Report dated Feb. 11, 2002 and English blank.

* cited by examiner

Primary Examiner—Kevin P. Kerns
(74) Attorney, Agent, or Firm—Crowell & Moring LLP

(57) ABSTRACT

A reactor structure has a heat transfer layer stacking construction with a stack of heat-conductive plate elements which, alternating in the stacking direction, bound one catalyst-filled reactor layer and one tempering layer respectively, adjacent plate elements being connected in a fluid-tight manner on at least two closed side areas. The plate elements on the closed side areas are bent in a U-shape and are arranged with U-side flanks which rest against one another in the stack such that the reactor layers have a larger height than the tempering layers. In addition or as an alternative, heat-conductive corrugated ribs are inserted at least in the reactor layers which are higher than the tempering layers.

18 Claims, 1 Drawing Sheet and Summary of the Invention

This application claims the priority of German Patent Document 100 49 194.4, filed in Germany, Oct. 5, 2000, the disclosure of which is expressly incorporated by reference herein.

The invention relates to a reactor structure as a heat exchanger layer stacking construction. Preferred embodiments relate to a reactor structure as a heat transfer layer stacking construction having a stack of heat-conductive plate elements which, alternating in the stacking direction, bound one reactor layer respectively, which is filled with a reaction catalyst material for catalyzing a chemical reaction, and one tempering layer respectively, through which a tempering medium can flow, adjacent plate elements being connected in a fluid-tight manner on at least two closed side areas. Such a reactor is suitable, for example, for being used as a reforming reactor for generating hydrogen in a fuel cell vehicle or in stationary fuel cell applications by reforming methanol or another applied substance.

This type of a reactor structure is disclosed in German Published Patent Application DE 44 20 752 A1. There, only the catalyst material filling them is charged into the reactor layers which have a larger volume, while the heat-conducting corrugated ribs are inserted into the tempering layers, which have a smaller volume, and in that case specifically are heating layers. In a different embodiment illustrated there, the reactor layers are not filled with a catalyst material but the facing sides of the plate elements are provided with a corresponding catalyst coating and supporting or flow-conducting corrugated ribs are inserted in the reactor layers as well as in the heating layers.

The invention is based on a technical problem of providing a reactor structure of the initially mentioned type which can be manufactured at relatively low expenditures in a compact and pressure-resistant form while it provides reactor layers which have a volume as large as possible, which reactor layers can be tempered to be maintained at a desired temperature by way of tempering layers situated in-between the reactor layers, and which reactor structure is particularly suitable for generating hydrogen for feeding a fuel cell system, for example, in a fuel cell vehicle.

Preferred embodiments of the invention solve this problem by structure arrangements that provide for reactor layers with a larger height than the tempering layers.

Special plate elements are used for the reactor structure according to certain preferred embodiments which on at least two non-adjacent side areas along which they are connected in a fluid-tight manner with one adjacent plate element respectively for forming a closed lateral area, extend in a U-shaped bent manner and are arranged with their U-side flanks resting against one another in the stack such that the reactor layers have a greater height than the tempering layers. By using the laterally appropriately bent plate elements, no separate lateral spacer elements are required for building up the layer stack. Simultaneously, the lateral U-shape is selected such that adjacent plate elements can be reliably connected with one another along their mutually facing U-side flanks and thus in a flat manner and not only in a linear shape in a fluid-tight manner. In addition, with respect to the tempering layers, clearly higher and thus larger-volume reactor layers can be formed, which in the case of a given, desired reactor conversion performance promotes a compact structural shape of the reactor structure.

Also in the case of the reactor structure according to certain preferred embodiments of the invention, such a compact structural shape can be achieved with larger-volume reactor layers and smaller-volume tempering layers. In addition, heat-conducting corrugated ribs are inserted into the reactor layers, which corrugated ribs, on the one hand, promote the heat transfer between the reactor layers and the tempering layers and the heat distribution within the reactor layers and, on the other hand, can be used as a supporting structure for the larger-volume reactor layers, which can improve the stability and the pressure resistance of the layer stacking construction. This measure can preferably be combined with the use of plate elements with lateral areas extending in a manner bent in a U-shape.

In a further development of certain preferred embodiments of the invention, essentially plane plate elements are used which are appropriately bent in a U-shaped at the corresponding lateral areas, so that, as a result, when the plate elements are joined together, lower tempering layers and higher reactor layers are alternatingly formed.

In a further development of certain preferred embodiments of the invention, plate elements of a corrugated structure are used for the reactor structure. In comparison to plane plate elements, while the base surface is the same, this results in a larger heat-transfer-active contact surface between the reactor layer and the heating layer.

In the case of a reactor structure further developed according to certain preferred embodiments of the invention, corrugated ribs are also provided in the tempering layers, which further contributes to the stability of the layer stacking construction and can improve the heat transfer characteristics.

Other objects, advantages and novel features of the present invention will become apparent from the following detailed description of the invention when considered in conjunction with the accompanying drawings.

DETAILED DESCRIPTION OF THE DRAWINGS

Figure 1:
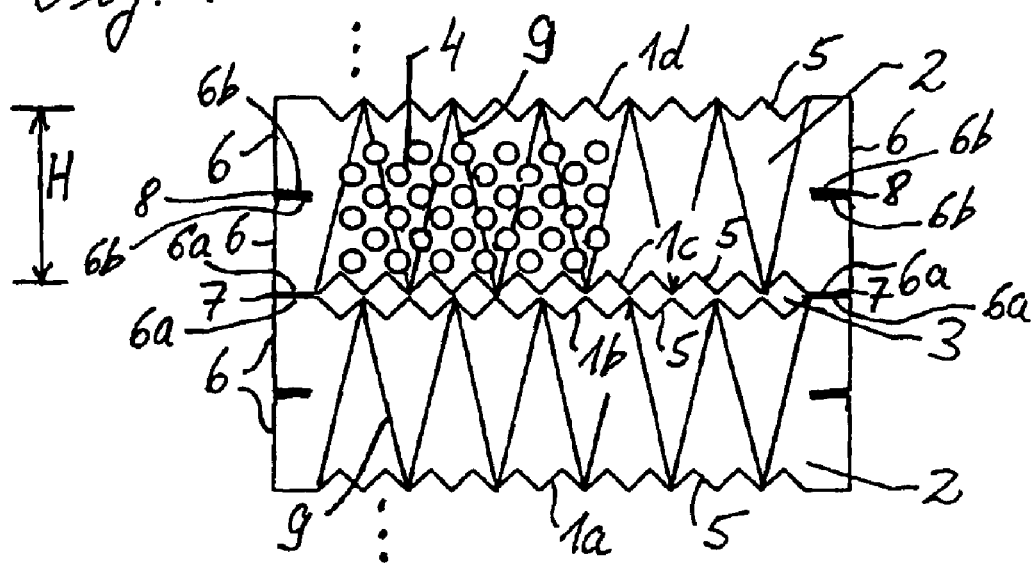
FIG. 1 is a schematic cutout-type longitudinal sectional view of a reactor structure as a heat transfer layer stacking construction consisting of plate elements having a corrugated structure constructed according to a preferred embodiment of the invention.

As a cutout, FIG. 1 illustrates a reactor structure as a heat transfer layer stacking construction with a stack of a definable number of heat-conducting sheet metal plate elements $1a$, $1b$, $1c$, $1d$ which bound, in the stacking direction, in an alternating manner one reactor layer 2 and one tempering layer 3 respectively. For the catalyzing of a desired chemical reaction to be implemented, each reactor layer is filled with a corresponding reaction catalyst material 4, for example, in the form of a catalyst charge, as indicated in FIG. 1 only in a partial section with circular symbols for the purpose of clarity.

Each sheet metal plate $1a$ to $1d$ has a corrugated structure 5 which can be produced, for example, by deforming from a plane sheet metal plate blank. As a result of the corrugated structure 5, in the case of a given base area, in comparison to plane plates, a higher surface area is obtained and thus a greater contact surface between a respective reactor layer 2 and an adjacent tempering layer 3, which improves the heat transfer between these layers 2, 3.

On two opposite side areas, the sheet metal plates 1a to 1d are bent in a U-shape 6 toward one side. The sheet metal plates 1a to 1d are then in each case placed against one another in the stack in an alternating tilted manner.

As a result, on the one hand, the tempering layers 3 are formed as comparatively low layer spaces defined by corrugated structures 5 of two adjacent sheet metal plates resting against one another, which layer spaces are closed laterally by fluid-tight connections 7. These connections 7 may be implemented, for example, by soldering, welding or gluing and, as flat fixations of inner flanks 6a of the edge-side U-shape 6 situated against one another, provide a reliable lateral sealing-off of the tempering layers 3 through which a suitable tempering medium can flow. According to the requirements, the two corrugated structures 5 which each rest against one another, can be arranged with parallel or mutually sloped longitudinal dimension axes of the wave crests and wave troughs transversely to the stacking direction, in the latter case, a cross-channel structure for the tempering layers 3 being implementable.

The reactor layers 2 are formed in that two pertaining sheet metal plates respectively, which bound the reactor layers 2, are placed against one another on the edge side with their U-shape and, more precisely, are placed against one another with the outer U-side flanks 6b of the U shape, so that the reactor layers 2 have a height H in the stacking direction which corresponds approximately to 1.5 to 2.5 times (advantageously twice) the value of the width of the U-shape, that is, of the distance between their two side flanks 6a, 6b. As a result of the fluid-tight flat connections 8 along the outer U-side flanks 6b resting against one another, for example, by means of soldering, welding or gluing, a reliable lateral sealing-off of the reactor layers 2 is provided.

Corrugated ribs 9 are inserted into the reactor layers 2 and extend in each case preferably continuously along the entire reactor layer volume and are supported against the reactor-layer-bounding corrugated structures of pertaining adjacent sheet metal plates 1a, 1b and 1c, 1d respectively. The corrugated ribs 9 consist of a heat-conducting material, for example, of the same material as the sheet metal plates 1a to 1d and therefore, on the one hand, carry out a supporting function stabilizing the stack and, on the other hand, a heat transfer function which promotes the charging of heat from the tempering layers 3 into the reactor layers 2 or the dissipating of heat from the reactor layers 2 into the tempering layers 3 and the achieving of a uniform heat distribution in the reactor layers 2.

According to the application, an exothermal or endothermal chemical reaction is carried out in the reactor layers 2; for example, an exothermal partial oxidation of methanol or an endothermal water vapor reforming of methanol for the purpose of producing a hydrogen-rich gas which can be used, for example, for fuel cells in a stationary or mobile fuel cell system. In the case of an exothermal reaction, the tempering layers 3 act as cooling layers; in the case of an endothermal reaction, they, in contrast, act as heating layers. For this purpose, a cooling or heating medium flows through them in a conventional manner.

Figure 2:
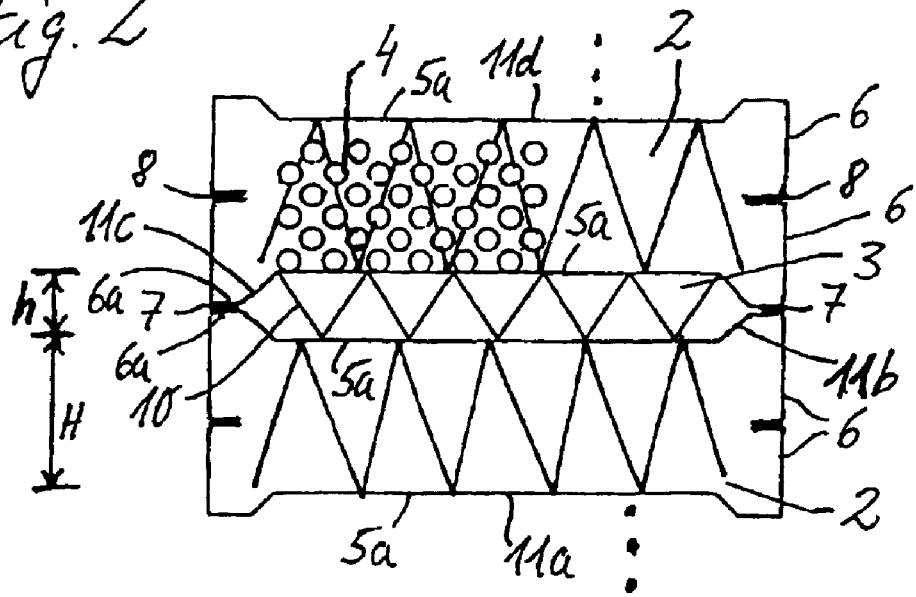
FIG. 2 is a view corresponding to FIG. 1 of a reactor structure made of plane plate elements constructed according to another preferred embodiment of the invention.

Again as a cutout, FIG. 2 shows a reactor structure which is similar to that of FIG. 1. For an easier understanding, functionally identical components are provided with the same reference numbers and reference can be made in this respect to the statements made concerning FIG. 1. One difference of the reactor structure of FIG. 2 consists of the fact that plane sheet metal plates 11a to 11d are used for constructing the layer stack and not those with a corrugated structure.

At two opposite lateral areas, the sheet metal plates 11a to 11d are again bent to the U-shape 6, specifically such that their inner side flank 6a, that is, the side flank which is situated closer to the remaining plate surface, is offset by a definable height h/2 in the one direction with respect to the remaining plane plate surface 5a, while the other outer side flank 6b is offset in the other direction by a defined larger height H/2 with respect to the plane main plate surface 5a. This has the result that by the alternating orientation of the identically designed sheet metal plates 11a to 11d in the stack, on the one hand, the tempering layers 3 are formed with a height h which corresponds to twice the value of the offset of the inner U-side flanks 6a with respect to the respective pertaining main plate surface 5a and, on the other hand, the reactor layers 2 are formed with a height H which is larger in this respect and which corresponds to twice the value of the outer U-side flanks 6b with respect to the respective pertaining main plate surface 5a.

In the case of the reactor structure of FIG. 2, corrugated ribs 10 are also inserted into the tempering layers 3 and, like the corrugated ribs 9 in the reactor layers 2, operate as supporting elements which hold the respective adjoining main plate surfaces 5a at a distance and, in addition, can carry out a heat and flow conducting function. Otherwise, the features and advantages indicated with respect to the reactor structure of FIG. 1 correspondingly apply to the reactor structure of FIG. 2.

As indicated in the above description of advantageous embodiments, the reactor structure according to the invention can be produced at comparatively low expenditures from plate elements placed on one another without the requirement of separate edge-side spacer elements as a compact heat exchanger layer stacking construction with relatively large-volume reactor layers and smaller-volume tempering layers. The individual layers are sufficiently stable as a result of mutually contacting corrugated structures of the plate elements themselves and/or because of corrugated ribs inserted into the layers and are reliably sealed off laterally by flat fluid-tight connections of adjacent plate elements. The reactor structure according to the invention can be used in single-stage or multistage reforming reactors for the water vapor reforming of methanol for the purpose of obtaining a hydrogen-rich gas mixture for feeding fuel cells of a fuel cell vehicle as well as in other chemical reactors in which the reactor layers are to be in a heat contact with tempering layers.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A reactor structure comprising a stack of heat-conductive plate elements, each having a main heat transfer surface; wherein:

said main heat transfer surface of said plate elements, alternating in a stacking direction, bound at least one reactor layer respectively that is filled with a reaction catalyst material for catalyzing a chemical reaction, and at least one tempering layer respectively, through which a tempering medium can flow;

at least two opposite edges of each said plate element are bent back on themselves toward a center area of the plate, forming side areas along opposite edges of said plate, said side areas having a substantially U-shaped cross section which is open toward said center area and bounded by opposing side flanks that are substantially parallel to said main heat transfer surface of said plate and are connected by a web portion that is substantially perpendicular to said side flanks;

adjacent plate elements are connected in a fluid-tight manner along said side areas;

the plate elements are arranged in the stack, resting against one another along said side flanks of said side areas, such that the reactor layers are formed with a larger height than the tempering layers.

2. The reactor structure according to claim 1, wherein;

each plate element has a main surface;

inner flanks of said side areas are offset relative to said main heat transfer surface by a definable smaller height in a first direction; and outer side flanks of said side areas are offset relative to said main heat transfer surface by a larger height in a second direction with respect to the main plate surface.

3. The reactor structure according to claim 2, wherein corrugated ribs are inserted in the tempering layers.

4. The reactor structure according to claim 2, wherein said main heat transfer surface is corrugated.

5. The reactor structure according to claim 1, wherein said main heat transfer surface is corrugated.

6. A reactor structure comprising:

a plurality of reactor layers filled with a reaction catalyst material for catalyzing a chemical reaction;

a plurality of tempering layers disposed respectively between the reactor layers, said tempering layers accommodating a tempering medium flow therethrough; and heat-conductive plate elements, each having a main heat transfer surface, said main heat transfer surfaces of said plate elements bounding the reactor layers and tempering layers, with adjacent plate elements connected in a fluid-tight manner on at least two closed side areas; wherein, at least two opposite edges of each said plate element are bent back on themselves toward a center area of the plate, forming said side areas along opposite edges of said plate, said side areas having a substantially U-shaped cross section which is oven toward said center area and bounded by opposing side flanks that are substantially parallel to said main heat transfer surface of said plate and are connected by a web portion that is substantially perpendicular to said side flanks;

the plate elements are arranged in the stack resting against one another along said side flanks of each of said side areas, such that the reactor layers are formed with a larger height than the tempering layers.

7. The reactor structure according to claim 6, wherein heat-conductive corrugated ribs are inserted in the reactor layers, which are formed with a height larger than a height of the tempering layers.

8. The reactor structure according to claim 8, wherein:

inner side flanks of said side areas are offset relative to said main heat transfer surfaces by a definable smaller height in a first direction; and outer side flanks of said side areas are offset relative to said main heat transfer surfaces by a larger height in a second direction with respect to the main plate surface.

9. The reactor structure according to claim 6, wherein said main heat transfer surface is corrugated.

10. The reactor structure according to claim 9, wherein corrugated ribs are inserted in the tempering layers.

11. The reactor structure according to claim 6, wherein a height of the reactor layers is between 1½ and 2½ times a height of the tempering layers.

12. The reactor structure according to claim 11, wherein the height of the reactor layers is twice the height of the tempering layers.

13. The reactor structure according to claim 6, wherein the plate elements are connected together at facing side flanks by one of soldering, welding and gluing.

14. The reactor structure according to claim 6, wherein the reactor structure forms a part of a methanol reforming reactor for a fuel cell driven vehicle.

15. A method of making a reactor structure for an exothermal or endothermal chemical reaction, comprising:

forming a plurality of reactor layers filled with reactor catalyst material for catalyzing a chemical reaction;

forming a plurality of tempering layers accommodating a tempering medium flow therethrough;

stacking the reactor layers and tempering layers adjacent one another with a tempering layer disposed between respective pairs of reactor layers; and bounding the reactor layers and the tempering layers with heat-conductive plate elements, each of which has a main heat transfer surface; wherein, at least two opposite edges of each said plate element are bent back on themselves toward a center area of the plate, forming side areas along opposite edges of said plate, said side areas having a substantially U-shaped cross section which is oven toward said center area and bounded by opposing side flanks that are substantially parallel to said main heat transfer surface of said plate and are connected by a web portion that is substantially perpendicular to said side flanks;

adjacent plate elements are in a fluid tight manner along said side areas; and the plate elements are arranged in the stack, resting against one another along said side flanks of said side areas, such that the reactor layers are formed with a larger height than the tempering layers.

16. The method of making a reactor structure according to claim 15, wherein heat-conducting corrugated ribs are inserted in the reactor layers which are formed with a height larger than a height of the tempering layers.

17. The method of making a reactor structure according to claim 15, wherein the plate elements are connected together at facing side flanks by one of soldering, welding and gluing.

18. A reactor structure comprising:

a plurality of reactor layers filled with a reaction catalyst material for catalyzing a chemical reaction;

a plurality of tempering layers disposed respectively between the reactor layers, said tempering layers accommodating a tempering medium flow therethrough; and heat-conductive plate elements, each having a main heat transfer surface, said main heat transfer surfaces of said plate elements bounding the reactor layers and tempering layers, with adjacent plate elements connected in a fluid-tight manner on at least two closed side areas; wherein, at least two opposite edges of each said plate element are bent back on themselves toward a center area of the plate, forming said side areas along opposite edges of said plate, said side areas having a substantially U-shaped cross section which is open toward said center area and bounded by opposing side flanks that are substantially parallel to said main heat transfer surface of said plate and are connected by a web portion that is substantially perpendicular to said side flanks;

said plate elements are arranged in a stack, with alternating upward and downward orientation in a stacking direction, and with said fluid tight connection being formed at adjacent flanks in adjacent side plate elements;

said main surfaces have at least one depression formed therein in the stacking direction; and said side portions extend in said stacking direction and are dimensioned to provide the reactor layers with a height larger than a height of the tempering layers.

* * * * *